Dec. 2, 1924.  1,517,624
A. G. GIRARD ET AL
COMBINATION FRUIT CRUSHER AND FLOUR SIFTER
Filed April 14, 1924
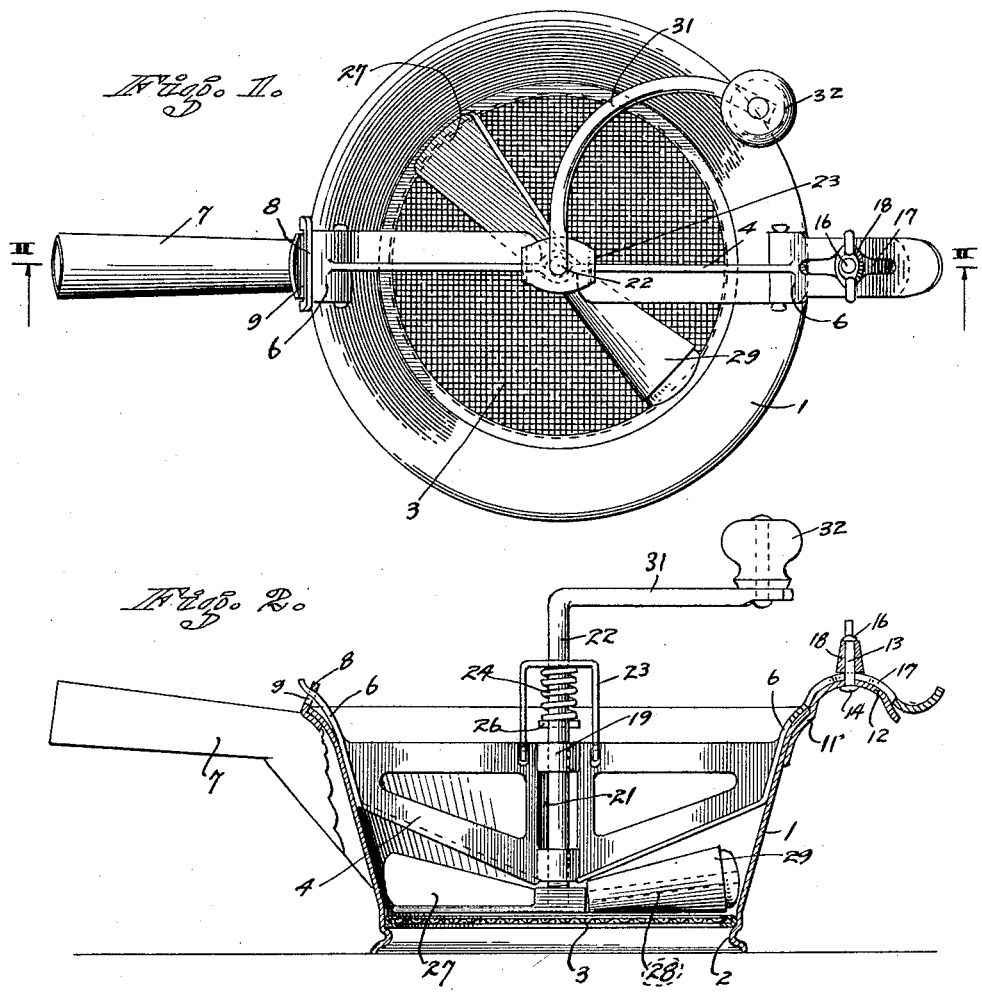
Inventor
ADOLPH G. GIRARD
ERNEST R. MOELLER Patented Dec. 2, 1924.

1,517,624

UNITED STATES PATENT OFFICE.

ADOLPH G. GIRARD, OF SAN FRANCISCO, AND ERNEST R. MOELLER, OF OAKLAND, CALIFORNIA.

COMBINATION FRUIT CRUSHER AND FLOUR SIFTER.

Application filed April 14, 1924. Serial No. 706,442.

*To all whom it may concern:*

Be it known that we, ADOLPH G. GIRARD and ERNEST R. MOELLER, citizens of the United States, and residents, respectively, of San Francisco, county of San Francisco, and Oakland, county of Alameda, in the State of California, have invented a new and useful Combination Fruit Crusher and Flour Sifter, of which the following is a specification.

The present invention relates to improvements in a combination fruit crusher and flour sifter, and its particular object is to provide a household article of general utility particularly adapted to be used for crushing fruit and the like, which at the same time may serve the purpose of sifting flour. It is proposed to provide a mechanism in connection with a vessel having a perforated bottom that may be readily inserted and removed and that will allow the above mentioned functions to be performed with ease. Further objects and advantages of our invention will appear as the specification proceeds.

The preferred form of our invention is illustrated in the accompanying drawings, in which Figure 1 shows a top plan view of our device, and Figure 2 a vertical section taken along line II—II of Figure 1. While we have shown only the preferred form of the invention, we wish to have it understood that various changes or modifications may be made within the scope of the claims hereto attached without departing from the spirit of the invention.

In its preferred form, the vessel (1) is frustro-conical with its upper marginal portion flaring outwardly in the manner shown in Figure 2. An annular bead (2) runs parallel to the bottom edge of the vessel and allows a perforated bottom (3) to be placed thereon. A plurality of interchangeable bottoms of different mesh may be provided to suit the occasion.

A web (4) extends transversely of the vessel and is provided with flanges (6) at the ends, which latter flanges are shaped to substantially conform to the outlines of the upper portion of the vessel.

A handle (7) extends outwardly from the vessel and adjacent thereto a lip (8) slotted as shown at (9) rises from the top edge of the vessel. Diametrically opposite the handle and the lip we provide an ear (11) curved outwardly as shown at (12) allowing the operator to manipulate the vessel by means of the handle and the ear.

One of the flanges (6) on the web structure is formed so as to allow of its introduction into the slot (9) of the lip (8) while the other flange (6) corresponds to the form of the ear (12) and may be secured thereto by means of a pin (13) provided with heads (14) and (16) at its ends, and preferably soldered to the ear so as to extend through a slot (17) in the flange (6) while a wing nut (18) may be used to secure the flange to the ear.

The web structure is bent as shown at (19) and (21) to provide a bearing for the vertical shaft (22), and a cage (23) rises from the web in concentric relation with the shaft (22) and allows a spring (24) to be confined between the top of the cage and a pin (26) extending through the shaft so as to urge the shaft downwardly.

From the lower end of the shaft extends a propeller blade (27), and in a direction opposite to that of the propeller blade an arm (28) having a frustro-conical roller (29) thereon. The upper end of the shaft is bent at right angles as shown at (31) and is provided with a knob (32) at its extreme end by means of which the shaft may be rotated.

To assemble the device it is only necessary to introduce one of the flanges (6) into the slot (9) of the lip (8) and to then tilt the web so as to bring the other flange (6) in contact with the ear (12) whereupon the latter flange may be locked by means of the wing nut (18). The material to be crushed, such as grapes, is placed into the vessel, whereupon the shaft (22) is rotated. The propeller blade and the roller cooperate in crushing the grapes and squeezing the juice and a part of the solid substance through the perforated bottom.

If flour is to be sifted, the propeller blade and the roller perform substantially the same function by cooperating in pulverizing the flour and in passing the same through the perforated bottom.

We claim:

A vessel having a handle extending therefrom and a slotted lip rising from the edge thereof adjacent to the handle, an ear rising from the edge opposite the handle and the lip and a supporting structure for an agitating means having flanges at either end, one of the flanges being adapted to be introduced into the slot of the lip and means being provided for securing the other flange to the ear.

ADOLPH G. GIRARD.
ERNEST R. MOELLER.